United States Patent [19]
Sladek et al.

[11] Patent Number: 4,542,664
[45] Date of Patent: Sep. 24, 1985

[54] GEAR TRANSMISSION

[75] Inventors: Zdenek Sladek, Brno; František Musil, Blansko; Ladislav Podmela; Miloslav Bursa, both of Brno, all of Czechoslovakia

[73] Assignee: Prvi brnenska strojirna, koncernovy podnik, Brno, Czechoslovakia

[21] Appl. No.: 480,685

[22] Filed: Mar. 31, 1983

[30] Foreign Application Priority Data

Nov. 24, 1980 [CS] Czechoslovakia .............. 8049-80

[51] Int. Cl.⁴ ............................................. F16H 1/28
[52] U.S. Cl. ........................................ 74/804; 74/198; 74/797; 464/103; 464/139
[58] Field of Search ............... 74/804, 802, 803, 805, 74/797, 63, 198, 86, 465; 464/103, 139

[56] References Cited

U.S. PATENT DOCUMENTS

| | | | |
|---|---|---|---|
| 1,844,471 | 2/1932 | Johnson | 464/139 X |
| 1,862,220 | 6/1932 | Johnson | 464/139 X |
| 2,490,525 | 12/1949 | Koller | 74/198 X |
| 2,677,288 | 5/1954 | Gnahrich | 74/804 |
| 2,874,594 | 2/1959 | Sundt | 74/465 X |
| 3,367,198 | 2/1968 | Schottler | 74/198 |
| 3,439,562 | 4/1969 | Bickley | 74/804 |
| 4,259,043 | 3/1981 | Hidden et al. | 74/86 X |

FOREIGN PATENT DOCUMENTS

| | | |
|---|---|---|
| 176638 | 1/1979 | Czechoslovakia . |
| 176639 | 1/1979 | Czechoslovakia . |
| 1966032 | 4/1971 | Fed. Rep. of Germany ........ 74/804 |
| 1957530 | 5/1971 | Fed. Rep. of Germany ........ 74/804 |
| 1960216 | 6/1971 | Fed. Rep. of Germany ...... 464/103 |
| 1265557 | 3/1972 | United Kingdom ................ 74/198 |

Primary Examiner—Lawrence J. Staab
Assistant Examiner—Dwight G. Diehl

[57] ABSTRACT

Face mechanical transmission equipment for the transfer and transformation of middle and high torques at low and middle speeds. The equipment includes two tandemly arranged and connected face rolling gear units, and makes possible a reduction of speed as high as 1:100.

5 Claims, 4 Drawing Figures

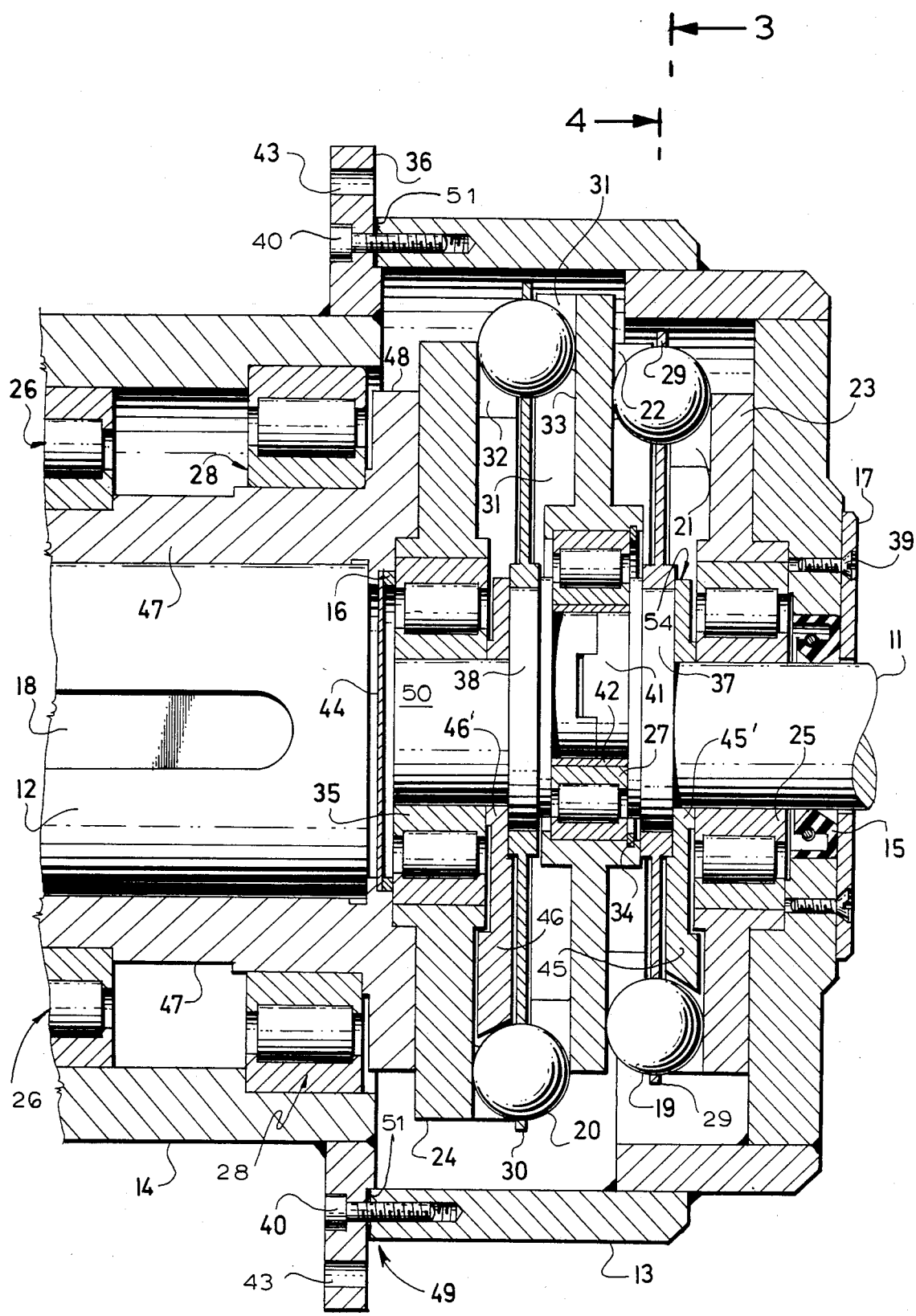
F I G. 1

GEAR TRANSMISSION

This application is related to the application of Podmela et al, Ser. No. 462,446, filed 1/31/83 and the application of Bursa et al, Ser. No. 466,038, filed, 2/14/83.

This invention relates to a gear transmission for the transfer and transformation of rotary motion, such equipment being particularly adapted to reduce the speed of rotation transmitted to it by a prime mover while substantially increasing the torque transmitted therethrough.

Known gear transmissions achieving such purpose usually include meshing gears, the drive between gears occurring by reason of engagement between the sides (faces and flanks) of the teeth of the respective gears. In such known gear transmissions the ratio between the speeds of rotation of the driving and driven shafts, which is defined as the ratio of the angular speeds of the mating gears, is usually constant, that is, the gearing does not pulsate. In order to meet such requirement of constant speed of the gear ratio, there are employed gears with fairly complicated profiles of the meshing tooth surfaces. In present practice, there are usually employed involute gear systems for both production and operating reasons.

The demands which are now made upon gear drives are constantly increasing. Thus gear transmissions having smaller and smaller dimensions and weight, as well as higher and higher torque outputs, are now being demanded. It is quite impossible to comply with such demands in some cases. One of the consequences of such a situation, for instance, is the necessity of branching of the great output of gear boxes of ships, as well as the gear boxes of rolling mills and of hoisting and other heavy equipment. There are also efforts to utilize other physical principles, for instance, hydraulic jet effects. However, with their utilization there always occurs very disadvantageous frictional effects, which inevitably result in considerable power losses. On the other hand, in systems employing mechanical, direct transformations through the direct transfer of normal reactions in cooperating gear couples, such pronounced frictional losses do not occur.

The possibility of a substantial increase of power transfer parameters, mainly of torques, is offered by rolling gears, wherein the normal reactions in every transmission couple are transferred through anti-friction transmission elements.

Rolling gears of the type sold under the trade name CYCLO are described in Czechoslovak Authors' Certificates Nos. 176,638 and 176,639. In such rolling gears the transmission elements are supporting rollers which are disposed in every transmission couple on the transfer pins of one transmission member, and which are in one-sided rolling contact with one wave formed cam of the second transmission member. In a planetary construction of such rolling transmissions, one of the transmission members is a fixed central ring with axially oriented and uniformly arranged transfer pins. The second transmission member, with regard to the maximum compensation of internal forces including twisting moments, includes two kinematically mutually combined satellite cam discs which form an epicycloid-hypocycloidal circuit.

Rolling transmissions of the CYCLO type are really compact gearings, having little weight and dimensions. Further possibilities of increasing the torque outputs and speed parameters of these otherwise very good designs of rolling transmissions, however, are limited, particularly because of the disadvantageous distribution of internal forces.

With rolling toroidal gearing, as well as in the above-mentioned epicyclic rolling gears of the CYCLO type, the driven and driving shafts are disposed coaxially. The transfer elements are in the form of supporting rollers which are in unilateral rolling transmission members. The first transmission member is a globoidal worm, which is disposed on a driving shaft, the second transmission member being a stator rim which is disposed in a toroidal gear box around the globoidal worm. In a toroidal space between the outer circuit of the globoidal worm and the inner circuit of the stator ring there is disposed a carrier ring which is in tight engagement with the driven shaft. On the carrier ring there are uniformly spaced carrier pins on which there are disposed rotatable satellite wheels on which there are fastened radially arranged transfer pins with turningly located supporting rollers. The rollers intervene between transfer grooves formed on the outer circuit of the globoidal worms and on the internal circuit of the stator ring.

Rugged and compact toroidal gearings make possible a transfer of really high torsional moments, as well as having a good efficiency and a relatively low weight. But the great disadvantage of such toroidal gearings is the great constructional complexity of the satellite wheels and the transfer rollers.

Considerable increases in the transfer parameters, particularly of torques, over the face rolling gears described in Czechoslovak Authors' Certificates No. 176,638 and 176,639 have been made possible by their constructions described and claimed in the above referred-to U.S. patent applications of Podmela et al, Ser. No. 462,446, filed 1/31/83 and of Bursa et al, Ser. No. 466,038, filed 2/14/83. Such improved transmissions include a pair of cooperating transmission members between which there is disposed a guide gear acting as a cage for a plurality of angularly spaced transmission elements cooperating with the grooves in the responsive transmission members. In the construction disclosed in Podmela et al application the guide gear floats between the opposed transmission members. In the transmission disclosed in the Bursa et al application the guide gear is turningly located on a fixed guide pin of a stabilizing group. A plurality of angularly spaced transfer elements, specifically balls (disposed in the guide gear) transferred torque between the driving and the driven transmission members.

With known face rolling gears disposed in a countershaft arrangement it is possible to effect at a maximum only a tenfold reduction of speed from the driving to the driven member. A face rolling gear in a planetary arrangement which permits a higher degree of speed reduction has not been known up to now.

The present invention has among its objects the illumination of a majority of the above-described disadvantages of previously known face rolling gears. In accordance with the invention there are provided two or more serially arranged face rolling gears which are so constructed and arranged as to make it possible to reduce the inlet speed of a driven member such as a shaft up to 100 times. Such face rolling gear is so compact and light in weight that it also possible in certain cases to use it as a replacement for existing worm gear units. The face rolling gear of the invention possesses a much greater efficiency than worm gear units, undergoes less wear in use, and can be produced by the use of less power and material than previous gear units. The gear unit of the invention may be made in many of its parts of non-ferrous metals. When the face rolling gear of the invention is used for the transmission of small amounts of power, it is possible to make the transmission members thereof of non-metallic materials such as plastic materials. In such cases, and also in other, less exacting applications, it is not necessary, because of the very good generating ratios, the higher efficiency, and the small heat production of the gear unit of the invention, to use lubricants within the gear case. Because of the light weight, simple operation, less production costs, and the lower prices of plastic materials and the possibility of using the gear unit without lubricants, it is also possible to use the face rolling gear of the invention to advantage at low temperatures, in a dusty or corrosive medium, in conveyors, transport devices, and the like.

In the embodiment of the gear transmission shown, two serially connected rolling face gear units are employed, a first or inlet unit having a first transmission member and a second transmission member, the first and second transmission members being disposed in spaced parallel relationship and having on their confronting faces transfer grooves in which there are rollingly disposed a plurality of angularly spaced transfer elements such as balls. The transfer elements are arranged in a guide gear in the form of a plate-like member which is journalled in its central portion upon a first eccentric guide pin on the inlet or drive shaft of the gear equipment. In the embodiment shown, the first transmission member is a fixedly mounted plate, whereas the second transmission member is of plate-like form and is journalled in its central portion upon a second eccentric connected to the driving shaft, said second eccentric being a guiding pin for the second transmission member. The second rolling face gear unit includes the second transmission member as the driving element thereof and a third transmission member in the form of a plate-like member disposed in spaced relationship with respect to the second transmission member, the confronting faces of the second and third transmission members being provided with face transfer grooves in which there are rollingly placed a second set of angularly spaced transfer members in the form of balls. The second set of transfer members are held in angularly spaced relationship by a second guide gear in the form of a thin plate disposed between the second and third transmission members. The second guide gear is journalled adjacent its center portion upon a second eccentric stabilizing pin which is drivingly connected to the driving or inlet shaft of the gear equipment. The third transmission member is drivingly connected with the outlet shaft of the gear equipment.

The transmission may include at least one eccentrically mounted balancing segment which turns with the eccentrics driven by the input shaft, whereby to minimize vibration of the gear transmission. Mutual axial positions of the outlet transmission member, the satellite transmission member, and the inlet transmission member are adjustable within the housing of the mechanism by means of fixing elements and through at least one adjustable element therefor.

The face rolling gear according to the invention produces only a small amount of noise and vibration in operation, which accompany the movement of the transfer elements along the orbit of the transfer grooves on the transmission members and thus give rise to shocks at the inlet and outlet of the transfer elements in the various grooves. In comparison with known face rolling gears, the arrangement of the present invention has less frictional losses. The planet arrangement extends the usefulness of the face rolling gears, and also permits, with the replacement of parts of different sizes, to change the ratio of the inlet and outlet speeds of the device. The planet arrangement of the device has great advantages in certain applications thereof because of the small axial dimension of the device and the fact that it operates with a rigid drive between the driving and driven elements, that is, it has substantially no back-lash.

A specific embodiment of the gear transmission of the present invention will now be described and explained with reference to the accompanying drawings, wherein:

FIG. 1 is a view in axial section through a preferred embodiment of face rolling gear in accordance with the invention;

Figure 2:
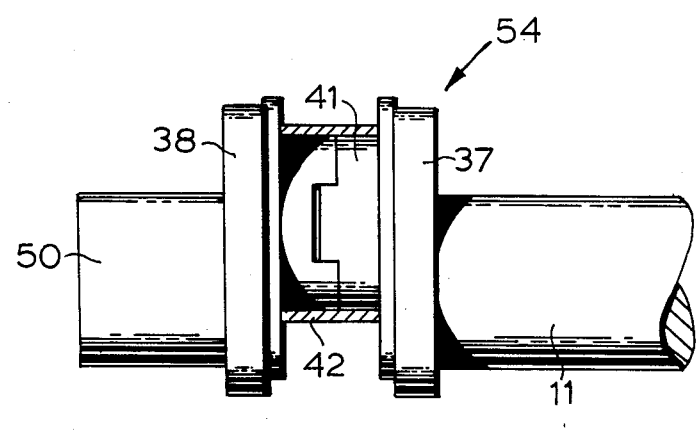
FIG. 2 is a view in side elevation of the driving shaft and the various eccentrics or cams attached thereto and/or driven thereby.
Figure 3:
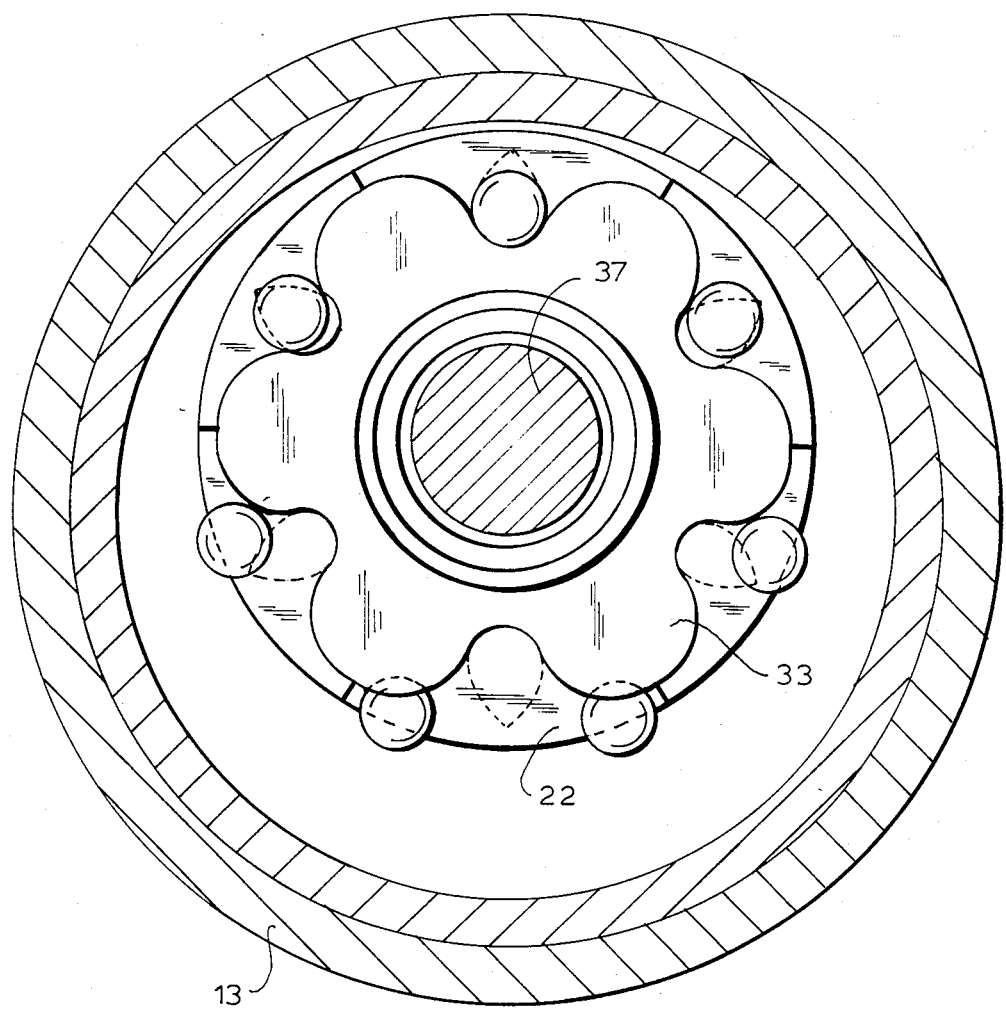
FIG. 3 is a view in transverse section through the first or entering unit of the gear equipment, the section being taken along the line 3—3 in FIG. 1 looking in the direction of the arrows.
Figure 4:
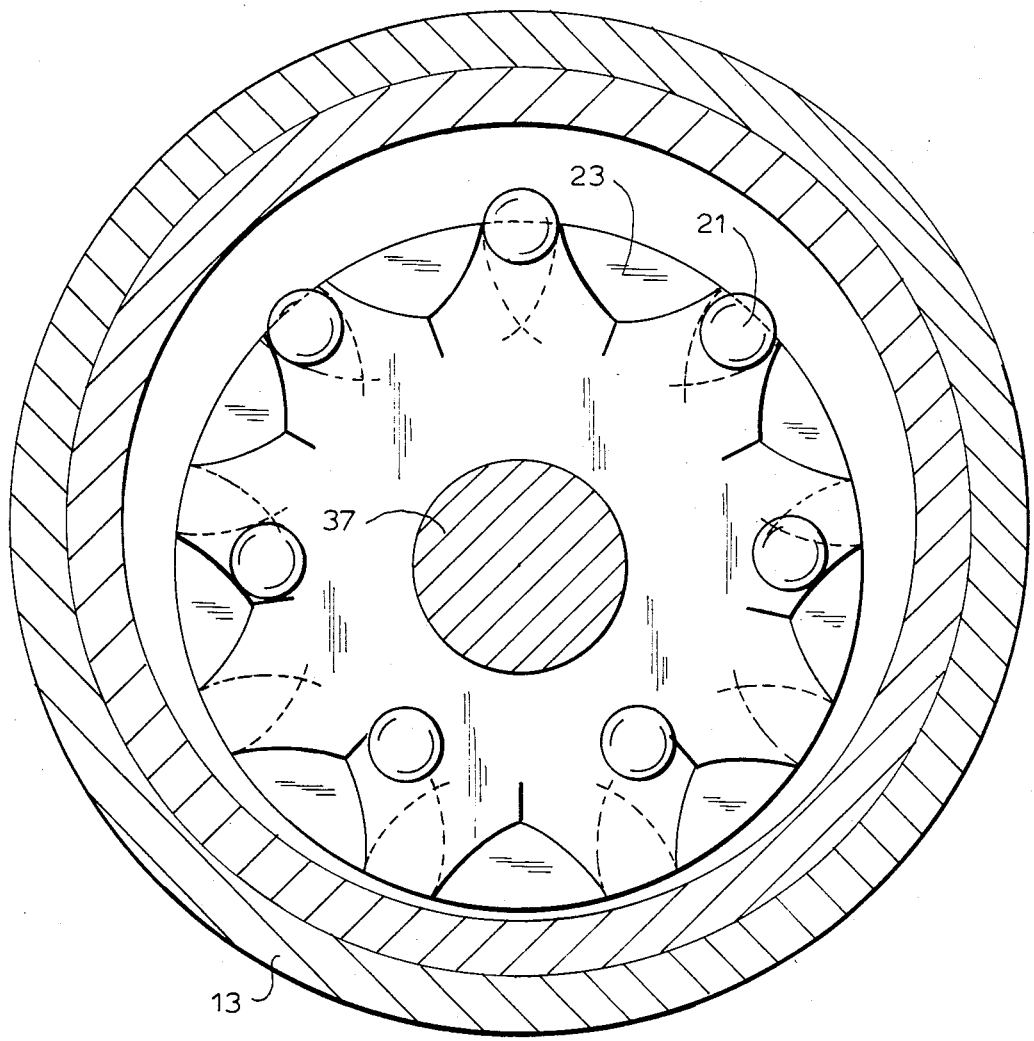
FIG. 4 is a view in transverse section through the gearing unit of the invention, the section being taken along the line 4—4 in FIG. 1 looking in the direction of the arrows.

Turning first to FIG. 1, in a two-part box or housing consisting of two frontally circumferentially connected box parts 13 and 14, there are disposed in parallel relationship transmission members 23, 33, and 24 reading in the direction from right to left in FIG. 1. All of these transmission members are of disc-like form, member 23 being fixedly mounted against rotation on housing part 13, whereas members 33 and 24 are rotatably mounted therein. Both box parts 13, 14 are made of welded semi-products, and are fastened to each other by fixing elements, here shown as machine screws 40 and are mutually positioned by fixing elements (not shown). A mounting flange 36 connected to the housing part 14 permits the attachment of the gearing mechanism to a driving or a driven device, or both by the use of bolts or the like passing through holes 43 in the flange 36. The members 23 and 33 constitute, with the balls 19 positioned there between, a first rolling gear unit, whereas the members 33 and 24, together with the balls 20 drivingly disposed there between constitute a second rolling gear unit, the first and second units being serially or tandemly drivingly connected. The balls 19 are received in grooves 21 in member 23 and grooves 22 in the confronting face of member 33. The balls 20 are received within grooves 31 on the lefthand face of member 33 and grooves 32 on the righthand, confronting face of member 24. The grooves 21, 22, 31 and 32 are of cycloidal shape. The grooves 22 and 31 are disposed on opposite sides of the transmission member 33, member 33 being disposed eccentrically with respect to the axis of concentrically arranged drive shaft 11 and driven shaft 12.

In the embodiment shown, there are 16 cycloidal transfer grooves 21 on inlet transmission member 23, and 14 cycloidal grooves 22 on transfer member 33. The cage 29, which guides the transfer elements or balls 19 has 15 equi-angularly spaced holes disposed in a circle therein, such circle being eccentric with respect to the common axis of shafts 11 and 12, there being a ball 19 disposed in each of the holes in the cage 29. There are 16 cycloidal transfer grooves 31 on transmission member 33, and 18 transfer grooves 32 on outlet transmission member 24. The cage 30, which bears the transfer elements or balls 20, has 17 holes therein disposed upon a circle which is eccentric with respect to the common axis of shafts 11 and 12. The cage 29, transfer member 33, the cage 30, and the outlet transfer member 24 are mounted upon a member 54, which is more clearly shown per se in FIG. 2.

Member 54 includes the axially inner end of driving shaft 11, a first eccentrically disposed circular cylindrical stabilizing part 37, a two-part guide pin 41 contained in a bushing 42, a second eccentrically mounted circular cylindrical member 38 forming a second stabilizing pin, and a stub-shaft portion 50 mounted coaxially of the driving shaft 11.

The driving shaft 11 is journalled in part 13 of the housing in a bearing 25 which supports shaft 11 against both radial and axially directed forces. The shaft 11 is sealed to the housing by an annular lubricant-retaining seal 15 which is retained by a cover plate 17 through which shaft 11 passes. Cover plate 17 is attached to housing part 13 by machine screws 39. As abovenoted, the first transmission member 23 is fixedly mounted upon the part 13 of the housing, such attaching means being omitted for clarity of illustration. The first guiding cage 29 is journalled in its intermediate portion upon the first stabilizing pin or member 37 of assembly 54. Because of the eccentric mounting of the cage 29 upon the assembly 54, a first compensating eccentric weight in the form of a segment 45 is keyed at its hub portion 45' to the driving shaft 11 so as to rotate therewith.

The transmission member 33 is mounted upon the eccentric guide pin 41 by a roller bearing 27 which receives the bushing 42 within its inner race. Because the member 33 is centrally journalled upon the eccentric guide pin 41, 42 no eccentric compensating weight is necessary therefor. The second guiding gear 30 is journalled eccentrically with relation to its center upon the second stabilizing pin 38 of the assembly 54. A second stabilizing weight 46, in the form of a segment, is keyed at its hub 46' to the stub-shaft 50 so as to rotate therewith.

The third transmission member 24, which forms the output member of the second gearing unit, is fixedly attached to the hub 48 of a sleeve member 47 which is journalled in bearings 26, 28 in the housing part 14. Such bearings sustain both radial and axial thrusts imposed upon the sleeve 47. The output shaft 12, which has a keyway 18 therein to permit attachment of it to driven apparatus, is keyed to the sleeve 47 to rotate therewith. A cover plate 44, interposed between the axially inner end of the driven shaft 12 and the axially outer end of the stub-shaft 50 and sealed thereto by an annular sealing means 16 prevents the escape of lubricant from the housing at such location. A yieldable annular member 51, interposed between the flange 36 and the lefthand end of the housing part 3 permits the two housing parts 13 and 14 to be variably drawn toward each other, as required to permit suitable compressive forces to be imposed upon the members 23, 29, 33, 20 and 24 to prevent appreciable slippage between the contacting parts, as well as to eliminate any wear to any of them which may have occurred.

The transfer grooves 21 of the inlet transmission member 23 are of hypocycloidal shape, the sides of such grooves being in the form of gothic functional surfaces. The grooves 22 in the transmission member 33 are of epicycloidal shape, and have gothic functional surfaces along their sides.

The transfer grooves 31 in the front surface of the transmission member 33 are of epicycloidal shape, whereas the transfer grooves 32 of the transmission member 24 are of hypocycloidal shape, the grooves in both such sets having gothic profiles of the functional surfaces.

The dimensions of mutual corresponding radial offsets of the transmission members 23, 33 and the transmission members 33, 24 are equivalent to a difference of the respective rolling radii of the respective transfer grooves 31 and 32.

The total speed transmission ratio i of the face rolling gear of the invention is given by the ratio between a number product of the transfer grooves 22, 32 and between a difference of the number product of the transfer grooves 22, 32 and the number products of the transfer grooves 21, 31. In the embodiment of the planet face rolling gear shown the speed ratio i is given by the following equation:

$$i = \frac{18 \cdot 14}{18 \cdot 14 - 16 \cdot 16} = -63$$

A negative sign of the transfer ratio i indicates that the driven shaft 12 turns in the opposite direction from the driving shaft 11. The amount of eccentricity of the first eccentric guide 37 and the amount of eccentricity of the second eccentric guide 38 are less than one-half the amount of eccentricity of the two-part guide pin 41.

The above-described face rolling gear operates as follows:

The driving shaft 11 is driven by a prime mover such as an electric motor (not shown). The shaft 11 which forms a part of the assembly 54 sets the planets in motion through the crank parts of assembly 54, such assembly driving both cages 29 and 30 around the central axis of the face rolling gear, that is, the common axis of the driving shaft 11 and the driven shaft 12. By these planetary motions the satellite transmission member 33 is caused to rotate by reason of the action of the transfer elements 19 with respect to the fixed inlet transmission member 23. Through the motion of the loaded transfer elements 19, in the field thereof wherein they engage the grooves in the member 23, the cage 29 is also driven so as to transfer out of the engagement field the discharged transfer elements 19 so that they again engage the grooves in the member 23.

Through the controlled planet generating of the satellite transmission member 33, the outlet transmission member 24 and thus also the driven shaft 12 are driven at the same time. The transfer elements 20, generating in the engagement field of the transmission member 33, 24 again set the cage 30 into rotation. Through a rotation of the transmission member 33 and of the cages 29, 30 around the guide pin 41 and the stabilizing pins 37 and 38, the driven shaft 12 is driven in the direction opposite that of the driving shaft 11. Axial pressure between the orbits of the transfer grooves and the transfer elements 19, 20 occurs by reason of the pressure exerted axially of the device between the housing parts 13 and 14 as they are forced toward each other.

When the functional surfaces of the transfer grooves and the transfer elements 19 and 20 are sufficiently hard, the planet carry face rolling gear has very little internal friction. Such a property is really welcome when using the rolling gear in positioning equipment, gears and tools, especially with tightness. Because of the possibility of an arrangement for the clearanceless travel of the parts in this rolling gear, it is also applicable for driving various instruments and precision machines, as well as in machine tools and forming machines, article handling equipment, etc.

Although the invention is illustrated with reference to one preferred embodiment thereof, it is to be expressly understood that it is in no way limited to the disclosure of such preferred embodiment but is capable of numerous modifications within the scope of the appended claims.

We claim:

1. A face gear equipment comprising a rotatable drive shaft for driving the equipment, and a rotatable driven shaft driven by the equipment, at least two serially connected rolling face gear units, a first, inlet face gear unit having a first transmission member and a second transmission member, the first and second transmission members being disposed in spaced parallel relationship and having on their confronting faces transfer grooves in which there are rollingly disposed a plurality of angularly spaced transfer elements such as balls, the transfer elements being arranged in a guide gear in the form of a plate-like member which is journalled in its central portion upon a first eccentric guide pin on the drive shaft of the gear equipment, the first transmission member being a fixed mounted plate, the second transmission member being of a plate-like form and being journalled in its central portion upon a second eccentric connected to the drive shaft, said second eccentric being a guiding pin for the second transmission member, a second rolling face gear unit including the second transmission member functioning as a driving element thereof and a third transmission member in the form of a plate-like member disposed in spaced relationship with respect to the second transmission member, the confronting faces of the second being provided with face transfer grooves in which there are rollingly disposed a second set of angularly spaced transfer members in the form of balls, the second set of transfer members being held in angularly spaced relationship by a second guide gear in the form of a third plate disposed between the second and third transmission members, a second eccentric stabilizing pin which is drivingly connected to the drive shaft of the gear equipment, the second guide gear being journalled adjacent its center portion upon the second eccentric stabilizing pin, the third transmission member being drivingly connected with the rotatable driven shaft driven by the equipment.

2. A face gear equipment as claimed in claim 1, comprising a housing, and wherein the first transmission member is fixedly mounted in the housing, while the second transmission member is fixedly connected to the rotatable driven shaft driven by the equipment.

3. A face gear equipment as claimed in claim 1, comprising a housing, and wherein the driving shaft has a two-part crank forming said second eccentric, one of said parts of the crank being turningly located in the housing, the first and second eccentric stabilizing pins being located on opposite sides of the crank.

4. A face gear equipment as claimed in claim 1, wherein an amount of eccentricity of the first eccentric stabilizing pin and an amount of eccentricity of the second eccentric stabilizing pin are less than one-half the amount of eccentricity of the second eccentric.

5. A face gear equipment as claimed in claim 1, wherein on the driving shaft there is eccentrically fastened at least one balancing segment disposed oppositely with respect to the first eccentric stabilizing pin and the second eccentric stabilizing pin and also with respect to the eccentric second transmission member.

* * * * *